UNITED STATES PATENT OFFICE.

WILLIAM A. TURBAYNE, OF LANCASTER, NEW YORK, ASSIGNOR TO GOULD COUPLER COMPANY, A CORPORATION OF NEW YORK.

ELECTRICAL SYSTEM OF DISTRIBUTION.

991,112.      Specification of Letters Patent.      Patented May 2, 1911.

Application filed May 19, 1909. Serial No. 496,979.

*To all whom it may concern:*

Be it known that I, WILLIAM A. TURBAYNE, a citizen of the United States, and a resident of Lancaster, in the county of Erie, State of New York, have invented certain new and useful Improvements in Electrical Systems of Distribution, of which the following is a specification.

My invention relates to electrical systems of distribution and, although it is not limited thereto, is more especially devised with respect to systems in which a main variable speed generator supplies a work circuit and in which a storage battery is arranged to be charged from the generator and to supply the work circuit when the main generator is not operative to do so.

One object of my invention is to provide an exceptionally simple arrangement for causing the battery to receive a tapering charge and for maintaining the voltage across the lamps or work circuit substantially constant irrespective of the amount of load on the work circuit or the condition of charge of the battery.

Various other objects, features and advantages will more clearly appear from the detailed description given below taken in connection with the accompanying drawings which form a part of this specification.

Figure 1:
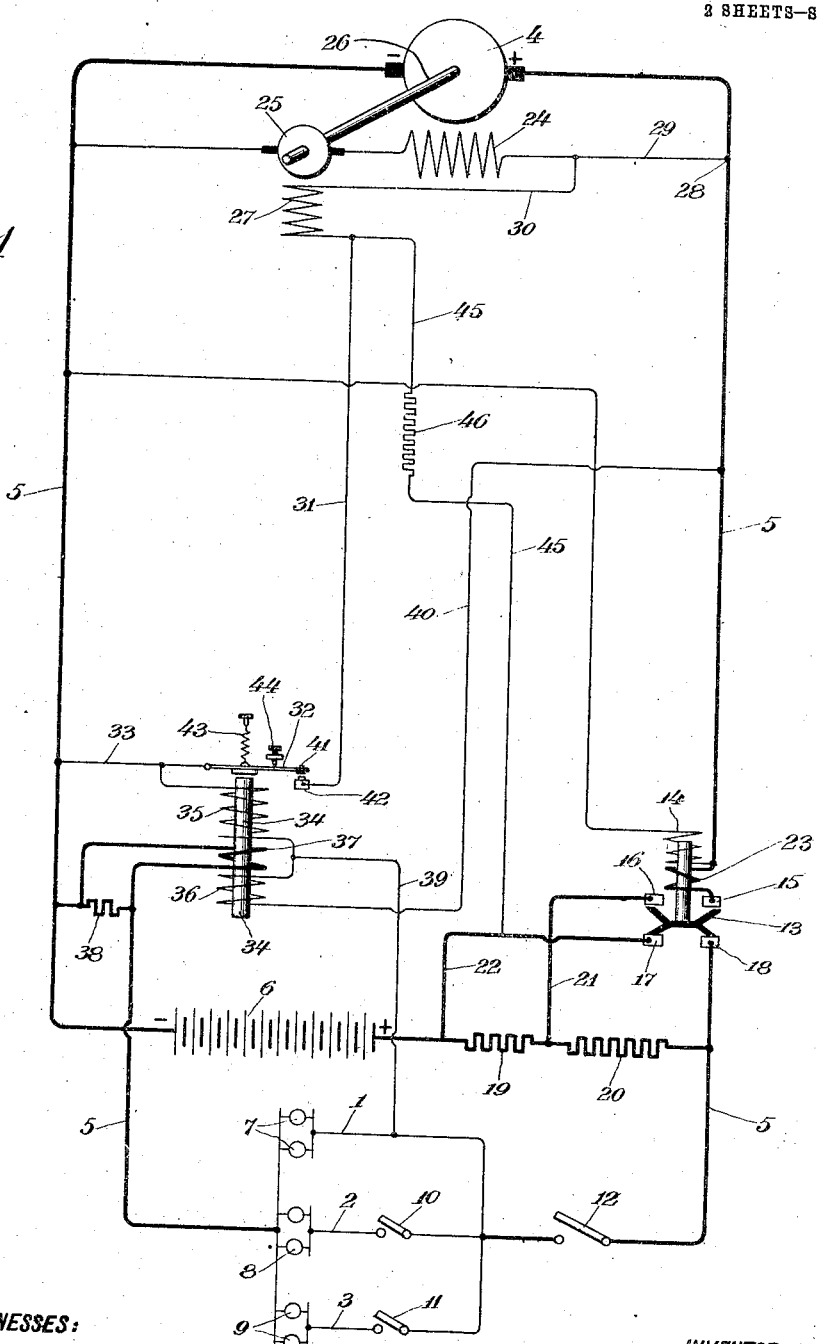
Figure 2:
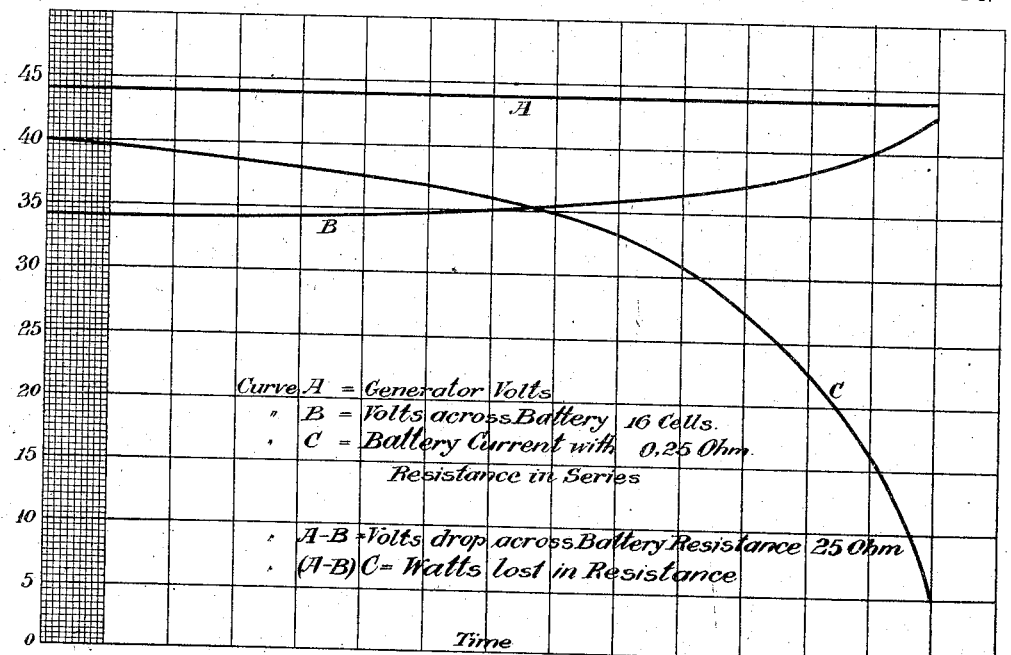
Figure 3:
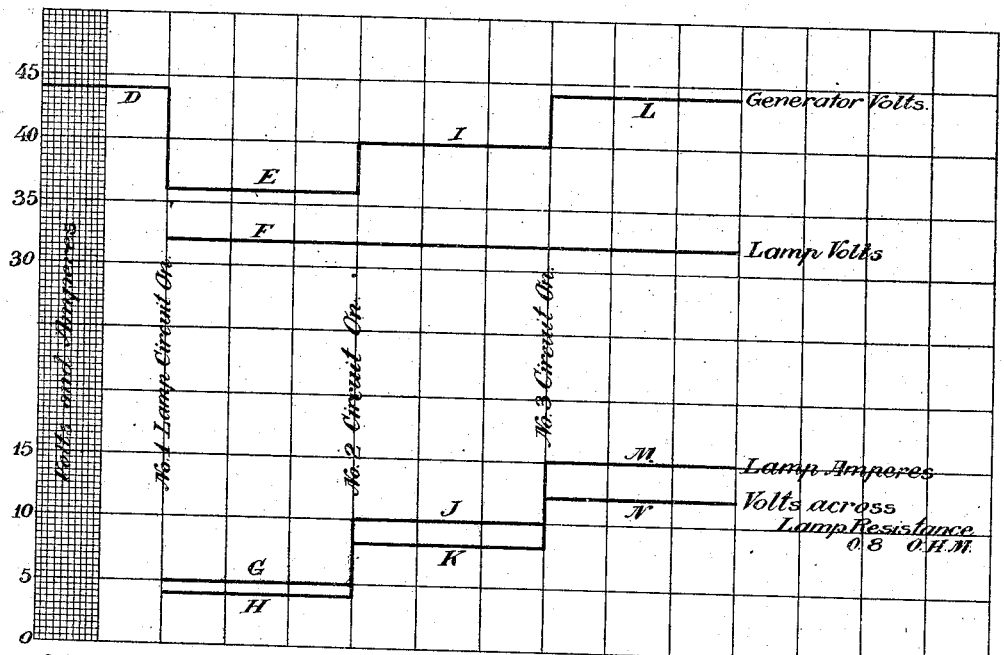

Referring to the drawings, Figure 1 represents diagrammatically a system embodying one form of my improvements. Fig. 2 is a set of curves showing the relationship between the generator voltage, battery voltage and battery current, while the battery is being charged. Fig. 3 is another set of curves showing the relation between generator volts, lamp volts, volts across the lamp resistance and the lamp or work circuit currents under different loads.

Referring to Fig. 1, 4 represents a main generator which may be driven in any suitable manner, for instance, as from the axle of a railway coach. Generator 4 feeds a circuit 5, 5 which supplies the storage battery 6 and lamps 7, 8 and 9. The lamps 7, 8 and 9 are arranged in parallel in three circuits 1, 2, 3 respectively. In the circuits 2 and 3 are arranged switches 10 and 11 arranged to close or open these circuits respectively. Adjacent the lamps 7, 8 and 9 and in the circuit 5 is another switch 12, which is arranged to close and open the circuit 5 at that point.

Between the switch 12 and generator 4 is a main automatic switch 13. This switch is controlled by a voltage coil 14 connected across the circuit 5, 5 so that it is responsive to voltage changes of the generator. In its upper position the switch 13 is arranged to electrically connect two terminals 15 and 16, and in its lower position is arranged to electrically connect two terminals 17 and 18. When the switch is in its upper position the battery and lamps are being supplied by the main generator 4. Under these conditions a fixed resistance 19 is in series with the battery and the fixed resistance 20 is in series with the work circuits 1, 2 and 3, the connection from the terminal 16 being to a point between the resistances 19 and 20, by means of a conductor 21. When in its lower position the switch 13 short-circuits the resistances 19 and 20 by connecting the terminals 17 and 18 together, the terminal 17 being connected directly to the battery by means of conductor 22. This connects the battery directly to the work circuits. A coil 23 in series in the conductor 5 is also arranged to aid in controlling the action of the switch 13. In case of a reverse current from the battery to the generator this coil opposes coil 14, thus causing the switch to open and opening the main circuit. When the main generator is feeding the work circuits and battery the coil 23 aids the coil 14 in maintaining the connection between terminals 15 and 16 closed.

The main generator 4 is provided with a shunt field 24 connected across the mains. In series with the field 24 is an auxiliary dynamo-electric machine 25 operating as a counter machine to oppose the voltage applied to the field 24. The machine 25 is shown as being driven from the same shaft 26 which drives the main generator 4. The counter machine 25 is excited by a field coil 27, which, when the machine is normally operating, is connected across the main circuit 5, 5 as follows: from point 28 through conductors 29 and 30, field 27, conductor 31, switch 32 and conductor 33 to the opposite side of the circuit 5. The switch 32 is of the vibratile character, being operated upon by an electromagnet 34 which is controlled by voltage coils 35 and 36 and a current coil 37, the coil 37 being connected across a shunt 38 which is in series with the circuit 5, 5, between the battery 6 and lamps 7, 8 and 9. One end of the voltage coil 35 is connected to the conductor 33 and the other end is connected to a conductor 39 which is connected to the circuit 1 of lamps 7. The voltage coil 36 is connected at one end to the conductor 39 and its other end is connected to the opposite side of the circuit 5, 5, near the generator by means of a conductor 40. The electromagnet 34 is arranged to attract the switch 32 to close the circuit through the conductors 31 and 33 between the contact terminals 41 and 42. This action is opposed by means of an adjustable spring 43, a stop 44 being provided to limit the action of spring 43.

A conductor 45 connects one terminal of the field 27 with the conductor 22, thus connecting the field 27 in series with the battery 6 when the main switch 13 is in its lower position. A resistance 46 is included in the conductor 45 to prevent an undue amount of current from flowing through the field 27 from the battery.

The operation of the system is as follows: When the main generator 4 is at rest the coil 14 is deënergized, the switch 13 is in its lower position and the battery 6 feeds the lamps through the circuit consisting of conductor 22, terminals 17 and 18, switch 13, circuit 5, switch 12, any lamps that may be turned on and circuit 5 back to the battery through coil 37 and shunt 38. If now the generator be started up the battery 6 will supply current to the field 27 through the following circuit: from the positive side of the battery through conductor 22 to conductor 45, field 27, conductors 30 and 29, main generator 4 and conductor 5 back to the negative side of the battery. This current will be in a direction to cause the auxiliary dynamo 25 to assist the field 24, thus aiding the main generator in building up its voltage rapidly. This action continues until the voltage of the main generator reaches a predetermined normal value when the strength of coil 14 will be such that it will operate the switch 13 to close the contact terminals 15 and 16 and open the circuit between the contacts 17 and 18. If we assume that the desired voltage at the lamps is 32 volts and the battery discharge voltage is 32 volts and the predetermined value of generator voltage at which the switch 14 operates is 44 volts, then upon the drawing up of the switch 13 the main generator will supply current through the circuit 5, conductor 21, fixed balancing resistance 19 to the battery and will supply current to the translating devices through the circuit 5, conductor 21 and fixed resistance 20. The resistance 20 which is thus inserted in series with the translating devices is just sufficient to cause a drop in voltage through the circuit from the generator to the translating devices so that the voltage on the translating devices may be practically 32 volts, as assumed. If, however, we assume that when the generator is producing 44 volts and there are no translating devices on, then the electromagnet 34 is operated upon by voltage coils 35 and 36, these coils being connected across the circuit 5, 5, by conductors 33 and 40. The voltage coils 35 and 36 are connected in series with each other but are arranged to oppose each other, the coil 35 being the stronger. If the voltage of the main generator tends to increase, the action of these coils increases, thus causing the switch 32 to close and energizing the field 27 strongly in the opposite direction, so that the auxiliary dynamo 25 will oppose the voltage applied to the main field 24, thus cutting down its strength and cutting down the voltage of the main generator. When the voltage of the main generator has decreased to its previous predetermined value of 44 volts the spring 43 opens the switch 32 so that the opposing effect of the auxiliary dynamo 25 no longer exists. It will thus be seen that the switch 32 will vibrate back and forth opening and closing the circuit through the field 27 to maintain the voltage of the main generator substantially constant. If now the switch 12 is closed so that the lamps 7 through the circuit 1 are thrown on, the coil 36 is shunted by means of conductor 39 and circuit 5. This causes the coil 35 to have an increased effect, thereby increasing the opposing effect of the auxiliary dynamo 25 so that the voltage of the main generator 4 is decreased. In the present instance this decrease is designed to be to 36 volts, under which conditions the voltage drop through the resistance 20 in series with the lamps will be 4 volts. At the same time the voltage coil 36 is shunted the current coil 37 is energized, said coil having an opposing effect to the voltage coil 35, but it is the combined effect of current coil 37 and voltage coil 35, with the voltage coil 36 shunted, that causes the drop in voltage of the main generator to 36 volts. If now circuit 2 with lamps 8 is thrown on by operating the switch 10 more current is taken from the generator through the circuit 5 and the strength of coil 37 is increased, thereby cutting down the effect of voltage coil 35 and the opposing effect of the auxiliary dynamo 35 so that the voltage of the main generator 40 is increased. In the present instance this increase is designed to be to 40 volts. The voltage across the lamps, however, is maintained the same at 32 volts because of the voltage drop through the fixed resistance 20. If again all of the lamps are thrown on by the further closing of switch 11, including lamps 9, a still further increase in current will take place so that the strength of coil 37 is further increased, thus cutting down the opposing action of the auxiliary dynamo 25 and causing voltage of the generator 4 to be increased, in the present instance, to 44 volts. This is the maximum voltage which the generator 4 can attain.

When there is no load whatever upon the work circuit the battery will be charged from the generator at 44 volts. The balancing resistance 19 is included in series with the battery so that if the 44 volts should be thrown on the battery when it is in a state of extreme discharge no undue amount of current will flow through the battery. As the battery voltage rises due to its charge the voltage of the battery will more nearly approach that of the generator and the battery current will fall off, so that a tapering charge is given the battery. This operation will be clear from a consideration of Fig. 2, in which the line A represents the substantially constant voltage of the generator, the line B represents the battery charging voltage showing its increase from 34 volts to 43 volts. During this increase the current drops from 40 to 5, and if continued the system will reach a condition in which the battery will practically float across the line. When, however, one or more of the lamp circuits is closed, thus cutting down the voltage of the main generator, as above described, the battery current is necessarily decreased, this decrease depending upon the condition of the battery charge at the time.

Referring to Fig. 3, various curves are there shown which indicate the generator volts, lamp volts, voltage across the resistance 20 and the lamp amperes under various conditions of load. The line D represents the generator volts when there is no load upon the work circuits. If now Number 1 circuit is thrown on the voltage of the generator drops to 36 volts, as shown by line E. Under these conditions the voltage across the lamps 7 will be 32, as indicated by line F, and the current through the lamps 7 will be 5, as indicated by line G, and the voltage drop through the resistance 20 will be 4, as indicated by line H. When Number 2 circuit is thrown on, thus including lamps 8, the voltage of the generator is increased to 40, as indicated by line I, the voltage at the lamp circuit remains the same, the current through the lamps is increased to 10 amperes, as indicated by line J, and the voltage drop through resistance 20 is increased to 8, as indicated by line K. When the total load is thrown on the generator, by also closing switch 11 and including lamps 9, the voltage of the generator is increased to 44, as shown by line L, the lamp volts remain the same, the current on the work circuit is increased to 15 amperes, as indicated by the line M, and the voltage drop across the resistance 20 is increased to 12, as indicated by line N. Under the conditions last mentioned the voltage of the generator will have been increased to its normal value of 44 volts and the battery will continue its charging as indicated by the curves of Fig. 2.

My invention, however, is not limited to the details as described except as clearly pointed out in the appended claims. By the provision of the fixed balancing resistance 19 I provide means for preventing injury to the battery by excessive charging currents when the battery is in a low state of charge. The provision upon the electromagnet 34 of both voltage coils and the current coil responsive to work circuit current variations provides an extremely simple, economical and efficient arrangement for controlling the voltage of the main generator in such a way that the voltage at the lamps is kept substantially constant. It will also be apparent that many other important advantages may be derived from my improvements which will be at once apparent to the skilled engineer.

I do not desire to be limited to the exact details shown and described, but

Having fully and clearly set forth my invention what I claim as new and desire to secure by Letters Patent, is:

1. In an electrical system of distribution, a variable speed generator, a work circuit and its translating devices and a storage battery arranged to be supplied thereby simultaneously, means for regulating the generator to maintain its voltage constant when there is no load on the work circuit and means coöperating with said first mentioned means to maintain the voltage at a substantially constant but at a less value when there is some load on the work circuit.

2. In combination, a main generator, a work circuit, a storage battery operatively related thereto, means for regulating the generator to maintain its voltage substantially constant when there is no load on the work circuit and means responsive to load changes on the work circuit coöperating with said first mentioned means to maintain the generator voltage substantially constant but at a less value when there is a given load on the work circuit.

3. In combination, a variable speed generator, a work circuit, a storage battery operatively related thereto, means for regulating the generator to maintain its voltage substantially constant when there is no load on the work circuit, and means responsive to current variations on the work circuit for co-acting with said first mentioned means to maintain the generator voltage at a substantially constant but at a less value for a given load on the work circuit.

4. In an electrical system of distribution, a variable speed generator, a work circuit and its translating devices arranged to be supplied thereby, a storage battery in operative relation thereto, means for regulating the generator to maintain its voltage substantially constant when there is no load on the work circuit, means for decreasing the voltage of the generator when load is thrown on the work circuit, and means for increasing the voltage of the generator as the load on the work circuit is increased.

5. In an electrical system of distribution, a variable speed generator, a work circuit and its translating devices and a storage battery arranged to be supplied thereby simultaneously, means for regulating the generator to maintain its voltage substantially constant when there is no load on the work circuit, and means for decreasing the voltage of the generator when load is thrown on the work circuit in order to decrease the charging current.

6. In combination, a variable speed generator, a storage apparatus, a work circuit supplied thereby, an electromagnetic device for maintaining the voltage of the generator substantially constant when there is no load on the work circuit, said device including means acting upon said device to decrease the voltage of the generator when a partial load is thrown on the work circuit, and means acting on said device to increase the voltage on the generator as more load is thrown upon the work circuit.

7. In an electrical system of distribution, the combination of a variable speed generator, a work circuit, a storage apparatus connected to be supplied thereby, a device for regulating the generator to control its voltage, windings for controlling said device and connected to be responsive to voltage fluctuations of the system, means for increasing the effect of said windings upon a flow of current in the work circuit and independent windings on said device for decreasing the effect of said windings upon further increase in the flow of current in the work circuit.

8. In combination, a variable speed generator, a work circuit, means for regulating the same to maintain its voltage substantially constant responsive to voltage fluctuations when there is no load on the work circuit, means coöperating with said first mentioned means to cut down the voltage of the generator and maintain the same substantially constant when a given load is thrown on the work circuit, and means co-acting with said first mentioned means to increase the voltage of the generator and maintain the same substantially constant upon a given increase in load on the work circuit.

9. In combination, a variable speed generator, a work circuit and a storage battery supplied thereby, an auxiliary dynamo for regulating the generator, an electromagnet for controlling the action of the auxiliary dynamo, including a voltage coil responsive to voltage fluctuations of the system for controlling said electromagnet, means for varying the effect of said voltage coil when any load is thrown on the work circuit, and means for varying the effect of said electromagnet as the load on said work circuit varies.

10. In combination with a variable speed generator, a work circuit and a storage apparatus supplied thereby, means for regulating the generator to maintain its voltage substantially constant when there is no load on the work circuit, said means including an electromagnet controlled by a voltage coil responsive to voltage fluctuations of the generator, and means for causing said electromagnet to be controlled by voltage fluctuations across the work circuit when any load is thrown on the work circuit.

11. In combination with a variable speed generator, a work circuit and a storage apparatus supplied thereby, means for regulating the generator to maintain its voltage substantially constant when there is no load on the work circuit, said means including an electromagnet controlled by a voltage coil, and means for causing said electromagnet to be controlled by voltage fluctuations across the work circuit when any load is thrown on the work circuit, and means for varying the action of said electromagnet responsive to increases in load upon the work circuit.

12. In combination, a variable speed generator, means for automatically regulating the voltage of the same, a storage apparatus, a work circuit arranged to be supplied by the generator, a fixed resistance in series with the work circuit, a fixed resistance in series with the battery, and means for short-circuiting said resistances to connect the storage apparatus directly with the work circuit responsive to certain variations in the electrical condition of the system.

13. In combination, a variable speed generator, a storage battery and a work circuit arranged to be supplied thereby, means for maintaining the generator voltage substantially constant when there is no load on the work circuit, a fixed resistance in series with the battery to prevent undue current therein when the battery is in a state of low charge, means for causing the generator voltage to be decreased when a partial load is thrown on the work circuit.

14. In combination, a variable speed generator, a storage battery and a work circuit arranged to be supplied thereby, means for maintaining the generator voltage substantially constant when there is no load on the work circuit, a fixed resistance in series with the battery to prevent undue current therein when the battery is in a state of low charge, means for causing the generator voltage to be decreased when a partial load is thrown on the work circuit, and means for causing the voltage of the generator to be increased as the load on the work circuit is increased.

15. In combination, a variable speed generator, a storage battery and a work circuit arranged to be supplied thereby, means for maintaining the generator voltage substantially constant when there is no load on the work circuit, a fixed resistance in series with the battery to prevent undue current therein when the battery is in a state of low charge, means for causing the generator voltage to be decreased when a partial load is thrown on the work circuit and a fixed resistance in series in the work circuit.

16. In combination, a variable speed generator, a storage battery and a work circuit arranged to be supplied thereby, means for maintaining the generator voltage substantially constant when there is no load on the work circuit, a fixed resistance in series with the battery to prevent undue current therein when the battery is in a state of low charge, means for causing the generator voltage to be decreased when a partial load is thrown on the work circuit, and means for short-circuiting said resistance to connect the battery directly to the work circuit when the voltage of the generator drops below a predetermined value.

17. In combination, a variable speed generator, a storage battery and a work circuit arranged to be supplied thereby, means for maintaining the generator voltage substantially constant when there is no load on the work circuit, a fixed resistance in series with the battery to prevent undue current therein when the battery is in a state of low charge, means for causing the generator voltage to be decreased when a partial load is thrown on the work circuit, said generator regulating means embracing an electromagnet controlled by a coil responsive to voltage fluctuations on the work circuit.

18. In combination, a variable speed generator, a storage battery arranged to be supplied thereby, a work circuit arranged in a plurality of parallel branches operatively related thereto, means for maintaining the generator voltage substantially constant when there is no load on the work circuit, means for causing the generator voltage to be materially decreased when the load on one of said branches is thrown on, and means for causing the generator voltage to be increased step by step as the load on the other branches is thrown on.

19. In combination, a variable speed generator, a storage battery and a work circuit arranged to be supplied thereby, an auxiliary dynamo for regulating the main generator, a vibratile switch for controlling the action of said dynamo, a coil responsive to voltage fluctuations of the work circuit for controlling said switch, a coil connected responsive to the voltage variations of the generator and arranged to oppose said first mentioned coil, and means for shunting said second mentioned coil when any load is thrown on the generator from the work circuit.

20. In combination, a variable speed generator, a storage battery and a work circuit arranged to be supplied thereby, an auxiliary dynamo for regulating the main generator, a vibratile switch for controlling the action of said dynamo, a coil responsive to voltage fluctuations controlling said switch, a coil connected responsive to the voltage variations of the generator and arranged to oppose said first mentioned coil, and means for shunting said second mentioned coil when any load is thrown on the work circuit, and a coil for opposing the action of said first mentioned coil as further load is thrown on the work circuit.

21. In combination, a variable speed generator, a storage battery and a work circuit arranged to be supplied thereby, an auxiliary dynamo for regulating the voltage of the main generator, a vibratile switch for controlling the field of said dynamo, an electromagnet for controlling said switch, voltage coils arranged to maintain the voltage of the generator substantially constant when there is no load on the work circuit and to decrease the voltage of the generator and maintain it substantially constant when a partial load is thrown upon the work circuit, a coil responsive to variations in the work circuit for causing the voltage of the generator to increase as the load on the work circuit is increased, a fixed resistance in series with the work circuit, a fixed resistance in series with the battery, and means for short-circuiting said resistance to connect the battery directly to the work circuit responsive to certain variations in the electrical condition of the system.

22. In combination with a generator, a storage battery and a work circuit including translating devices, a fixed resistance in series with the battery, a fixed resistance in series with the work circuit, means for maintaining the generator voltage substantially constant when there is no load on the work circuit, co-acting means for reducing the generator voltage when the work circuit is energized and additional means for co-acting to increase the generator voltage substantially proportional to increases in the voltage drop developed across said second mentioned fixed resistance as the load on the work circuit increases.

23. In combination with a generator, a storage battery and a work circuit including translating devices, a fixed resistance in series with the work circuit, means for maintaining the generator voltage substantially constant when there is no load on the work circuit, co-acting means for reducing the generator voltage when the work circuit is energized, and co-acting means for increasing the generator voltage as the voltage drop across said fixed resistance is increased in order to maintain the voltage at the translating device substantially constant.

In testimony whereof, I have signed my name to this specification, in the presence of two subscribing witnesses.

WILLIAM A. TURBAYNE.

Witnesses:
W. H. PATTENDEN,
THOS. DOBBINS.

Copies of this patent may be obtained for five cents each, by addressing the "Commissioner of Patents, Washington, D. C."